Patented Nov. 16, 1948

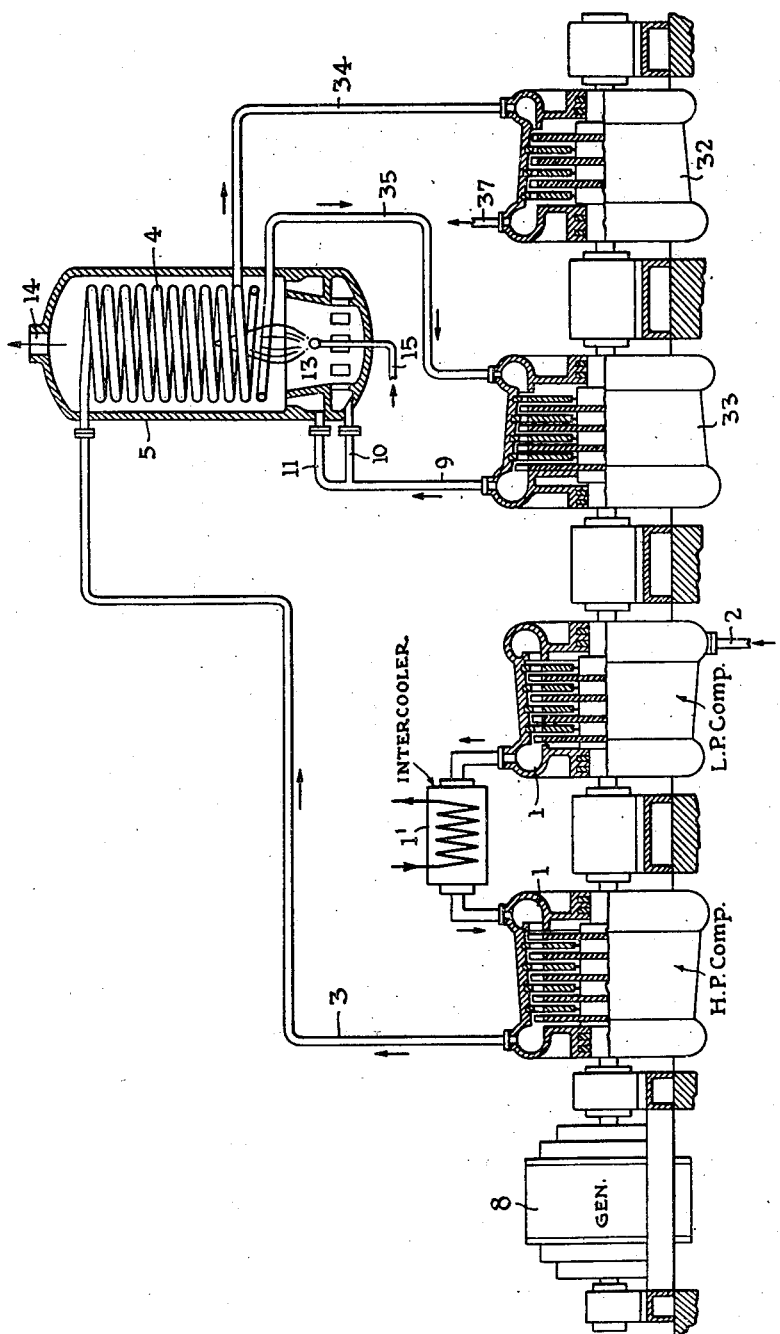

2,453,938

UNITED STATES PATENT OFFICE 2,453,938

TURBINE THERMAL POWER PLANT USING HOT AIR AS MOTIVATING FLUID

David Schmidt, Zurich, Switzerland, assignor to Escher Wyss Maschinenfabriken Aktiengesellschaft, Zurich, Switzerland, a corporation of Switzerland Application November 19, 1945, Serial No. 629,386
In Switzerland December 14, 1944

1 Claim. (Cl. 60—59)

This invention relates to a thermal power plant in which surrounding air is compressed in at least one compressor, then heated indirectly in an air heater and afterwards expanded in at least one turbine.

There are cases in which it is less important in such plants, and particularly those of small output, to secure to very high degree of efficiency than it is to provide a cheap, simple plant which is of small weight and does not take up a great deal of space. To make allowance for these facts the object of the present invention is to provide a thermal power plant with indirect heating of the driving air, in which a preheater and blowers for the air required for the support of combustion and the circulation of the flue gases can be dispensed with. A preheater for the driving air may also be dispensed with entirely or at the most a preheater which is of small weight and takes up only a small amount of space may be employed, and yet a far reaching utilisation of the heat carried away in the exhaust air from the turbine and the gases produced by combustion may be obtained, so that the total loss of waste heat is reduced to a minimum and a favourable degree of efficiency of the plant obtained notwithstanding.

In order to secure these various advantages, in a thermal power plant according to the present invention, at least part of the quantity of air which is expanded in the turbine passes, after having passed through at least part of this turbine, into the combustion chamber of the air heater, in which the heat still contained in this quantity of air is utilised directly.

A preferred embodiment of the invention is illustrated in the accompanying drawing in which the single figure is a view partly in elevation and partly in section.

The thermal power plant shown in Fig. 1 comprises a compressor 1 of the two-casings type, which draws in air from the surrounding atmosphere through a pipe 2. This air, which is cooled at 1¹ between two compression stages, is raised in this compressor 1 to a higher pressure and passes hereupon through a pipe 3 into a heating coil 4 of an air heater 5, to which fuel is supplied through a pipe 15.

The air heated in the heater 5 is expanded in two turbines 32 and 33, which are connected in parallel as to the flow of air. The air flowing to the turbine 32 through pipe 34, is not heated as highly as the air flowing to the turbine 33 through the pipe 35, this for the reason that the pipe 34 is branched off from the heating coil 4 of the heater 5 at a point where the temperature of the heated air is lower than that of air leaving through pipe 35.

The exhaust air from the turbine 32 flows directly to atmosphere, as indicated at 37, while the exhaust air from the turbine 33 passes to the air heater 5. This exhaust flow from turbine 33 is by way of pipe 9 to the two branch pipes 10 and 11. The branch 10 leads to the combustion chamber 13 of the heater. The branch 11 supplies mixing air to the heater.

The heat contained in the exhaust air passing from the turbine 33 is effectively used since it is possible to assure that gases finally discharging through the off-take 14 will be at a temperature lower than the temperature of air flowing to the heater through branch 10. This result is accomplished by suitable dimensioning of the heating surface 4.

The air exhausted by the turbine 32 can be passed directly to atmosphere without passing through any heat recovering device. It is possible to reduce the temperature of the air in its flow through the turbine 32 to a relatively low value, say 200° C.

The two turbines 32 and 33 are mounted on a common shaft with the two compressor units 1 and with a consumer of useful energy, here shown as a generator 8.

The nature of the construction of the compressor, of the turbine and of the heater, in which the air is to be heated indirectly, plays no part in the essential features of the present invention.

It may be stated quite generally, that the choice of the speed, the mutual combination and the subdivision of the groups may vary in dependence on the amount of power, temperature and pressure conditions according to the laws whch hold good for machines of the flow type for the attainment of the best possible degree of efficiency.

What is claimed is:

A thermal power plant, comprising in combination, at least one compressor which draws in air from the surrounding atmosphere and brings it to a higher pressure; a heater having a combustion chamber and in which heat is given up indirectly to said compressed air; a piping connecting the outlet of said compressor directly to the compressed air inlet of said heater; two turbines in which said compressed, heated air is expanded and which are arranged in parallel as regards the flow of the air through them; a connection between a point of said heater where a lower temperature prevails than at the outlet of the latter and one of said turbines, the heated air supplied to this turbine being expanded therein down to atmospheric pressure and hereupon discharged into the atmosphere; a further connection between the outlet of said air heater and the other one of said turbines, the air supplied to the last mentioned turbine being discharged after expansion therein into said combustion chamber; a consumer of useful energy; and driving connections through which said turbines drive said consumer of energy and said compressor.

DAVID SCHMIDT.

REFERENCES CITED

The following references are of record in the file of this patent:

UNITED STATES PATENTS

| Number | Name | Date |
|---|---|---|
| 2,268,270 | Traupel | Dec. 30, 1941 |
| 2,298,625 | Larrecq | Oct. 13, 1942 |
| 2,379,452 | Nettel et al. | July 3, 1945 |
| 2,394,253 | Nettel et al. | Feb. 5, 1946 |

FOREIGN PATENTS

| Number | Country | Date |
|---|---|---|
| 215,485 | Switzerland | Oct. 1, 1941 |